Sept. 23, 1941.  E. J. DONDLINGER  2,256,974
DUAL DRIVE TRANSMISSION
Filed April 17, 1940  2 Sheets-Sheet 1

Inventor:
Eugene J. Dondlinger
By: [signature]
Attorney.

Sept. 23, 1941.  E. J. DONDLINGER  2,256,974
DUAL DRIVE TRANSMISSION
Filed April 17, 1940  2 Sheets-Sheet 2
Fig. 2
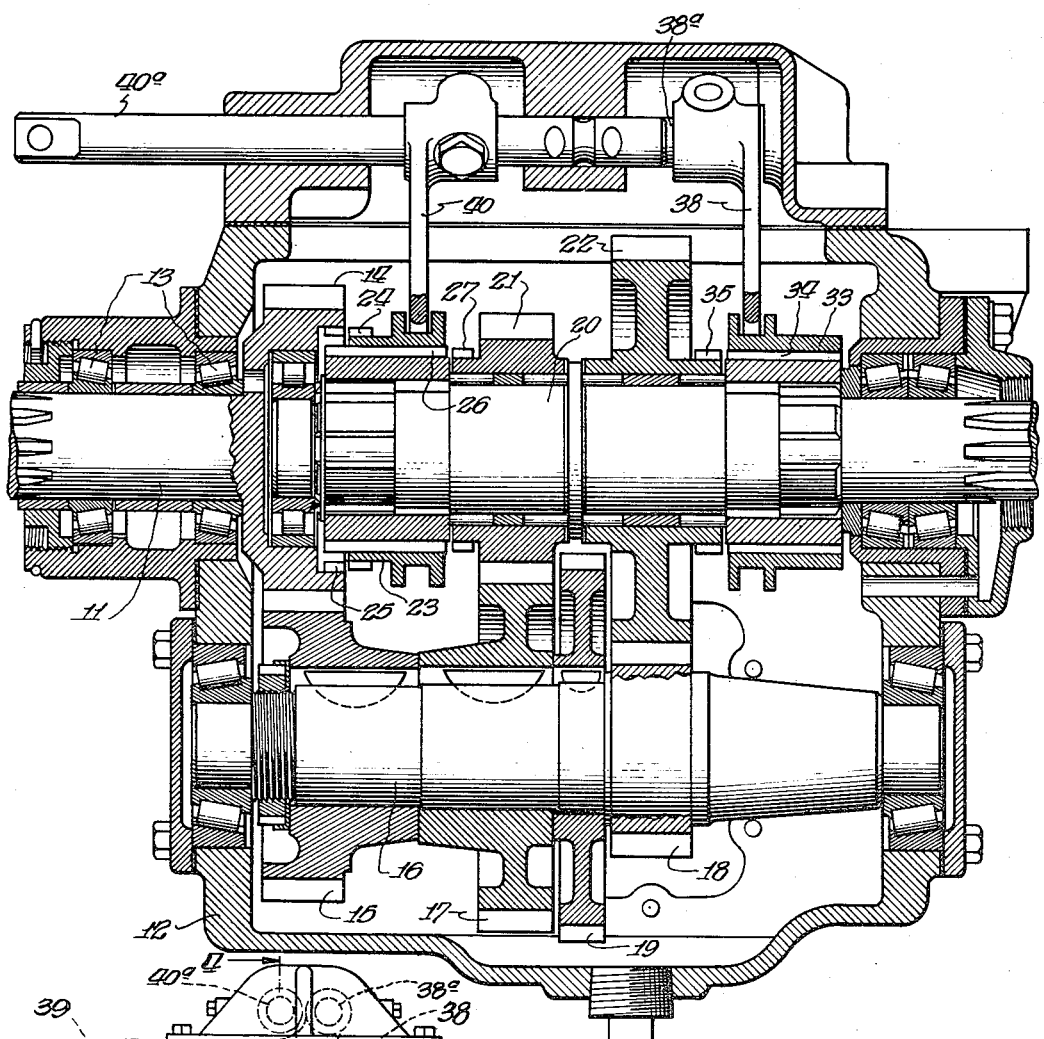
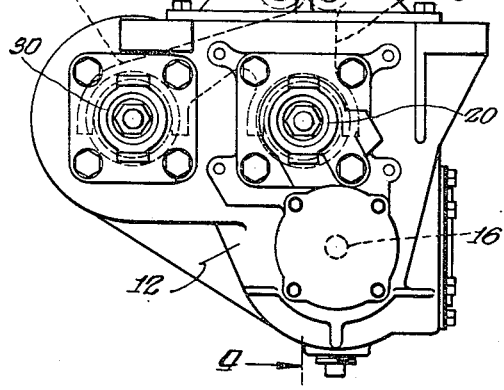
Fig. 3
Inventor:
Eugene J. Dondlinger
By: [signature]
Attorney.

Patented Sept. 23, 1941

2,256,974

UNITED STATES PATENT OFFICE 2,256,974

DUAL DRIVE TRANSMISSION

Eugene J. Dondlinger, Chicago, Ill.

Application April 17, 1940, Serial No. 330,135

12 Claims. (Cl. 180—22)

This invention relates to motor trucks having dual driving axles and provided with separate driving shafts for such axles, together with an auxiliary or special transmission in addition to the regular transmission for securing a wide range of selective gear ratios and arrangements for utilizing the engine power under various conditions.

One object of the invention is to provide an auxiliary transmission through which power is supplied to the dual axles only by way of the low speed gear ratio.

Another object is to provide selective gear and clutch connections between a vehicle power plant and dual drive axles so arranged that only one of said axles is connected to the power plant when the higher gear ratios are employed while both axles are automatically connected for service at the lower gear ratios.

A further object is to provide, in addition to the regular transmission, an auxiliary transmission affording an over-drive, a direct drive and an under-drive, with clutch and gear arrangements by which dual drive axles are placed in service through the under-drive only, and one of said axles assumes the load alone when the direct drive or over-drive are employed.

Various features and advantages of the invention will appear from the following description. The invention consists in certain features and elements of construction in combination, as herein shown and described and as indicated by the claims.

In the drawings:

Figure 4 is a vertical sectional view taken substantially as indicated at line 4—4 on Figure 3 and on a relatively large scale, showing the main shaft and side shaft with their gears and clutch elements.

Figure 5 is a somewhat diagrammatic perspective view showing a manual control lever and connections therefrom for shifting the clutches of the special transmission.

Figure 1:
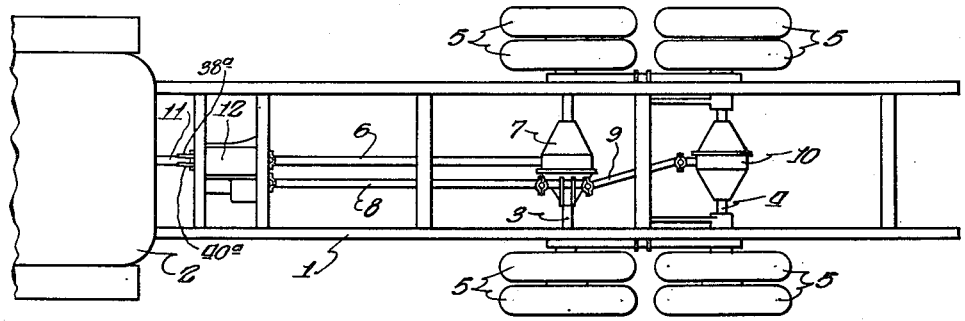
Figure 1 is a partial plan view of a motor truck and chassis showing the dual rear axles with separate drive shafts therefor, and indicating the location of the special or auxiliary selective transmission through which said shafts are driven.

In heavy duty motor trucks equipped with dual drive axles there are various methods of transmitting the power to these axles from the engine. In addition to the usual selective speed-change transmission such trucks are frequently equipped with an auxiliary or special transmission providing two or more supplemental gear ratios which increase the flexibility of the power system and adapt it to a wide variety of conditions. Since the lowest speed ratios will nearly always be employed under conditions in which maximum traction is desirable, it is logical that both drive axles should be connected to the power plant when the low gear ratios are employed. And since at these lower ratios a maximum torque is transmitted to the axles it would amount to a serious over-load if concentrated on one of the dual axles, and it is therefore important that under these conditions the power be divided and delivered simultaneously to the two axles and their drive wheels.

But the higher ratios are usually placed in service either in ordinary hauling over fairly smooth roads or in return trips when the truck is traveling without a load, making it possible to drive at a fairly high rate of speed, and desirable at the same time to reduce this idle time of the truck to a minimum. If both drive axles are connected to the engine under these conditions there is likely to be a certain amount of conflict or "gear fight" produced in the transmission by reason of the positively geared relation of the two drive axles, particularly when traveling on dry, concrete roads, which give good traction to the tires of all four driving wheels. Such conflict will be caused by a slight difference in tire sizes, or by differences in the distance traveled by the several wheels in turning corners or traveling otherwise than in a straight line under conditions which prevent the tires from slipping to compensate for these inequalities. As a result, the gears and shafts are seriously strained and frequently break under the internal stresses thus produced.

Therefore, the present invention provides separate drive shafts for the dual axles, and arranges for them to be positively geared together for simultaneous operation through the low-speed gearing or "under-drive" of the auxiliary transmission; but it also prevents the transmission of power to one of these drive shafts and its corresponding axle when either the direct drive arrangement or the high-speed or "over-drive" of the auxiliary transmission is employed. Thus the mechanism is insured against the undue strains and possible breakage which might otherwise occur in these higher speed ranges. The drawings show a portion of a motor truck frame 1, with the driver's cab indicated at 2, and with rear dual axles 3 and 4 each provided with road wheels 5. The axle 3 is actuated through a drive shaft 6 and the usual differential gearing enclosed in the housing 7, while the axle 4 is provided with a drive shaft 8 having a rear articulated section 9 connected into a differential housing 10. It may be understood that the vehicle includes the usual motor, not shown, and a regular speed-change transmission, not shown, from which a power delivery shaft 11 extends into the housing 12 of a special or auxiliary transmission by which said power delivery shaft 11 is connected for actuating the shafts 6 and 8 and their respective axles 3 and 4.

Figure 4 shows the rear-end portion of the power delivery shaft 11, carried in bearings 13 supported by the transmission case 12. Within the casing the shaft 11 carries a gear 14 permanently and rigidly secured to its inner end. This gear is in constant mesh with a gear 15 keyed to a side shaft 16 which is journaled in the lower portion of the casing 12. The side shaft carries additional gears 17 and 18, both rigidly secured to the shaft, and Figure 4 also shows a special gear 19 secured thereto to serve as a power take-off for driving auxiliary equipment, if desired.

In axial alignment with the power delivery shaft 11 the housing 12 contains a main shaft 20 on which there are rotatably carried a gear 21 and a gear 22, meshing respectively with the gears 17 and 18 on the side shaft. The gear ratios are such that the gear 21 is driven through gears 14, 15 and 17 at a rate of speed higher than that of the power shaft 11, while the gear 22 is driven at a lower speed than the power shaft 11.

Figure 2:
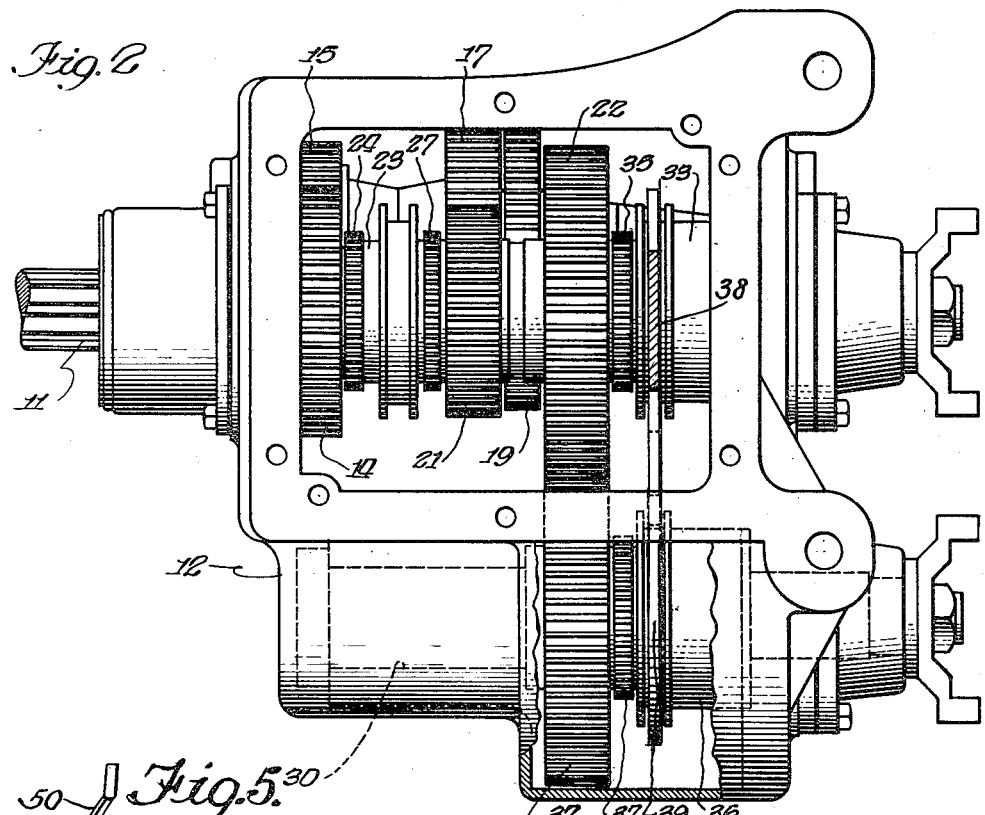
Figure 2 is a top plan view of the special transmission with the cover removed and with a portion broken away to show the gearing therein.
Figure 3:
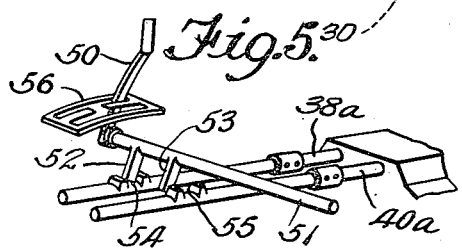
Figure 3 is an end elevation of the special transmission showing it on a small scale merely for the purpose of locating the principal elements.

A clutch sleeve 23, splined on the forward end of the main shaft 20, is provided with external teeth 24 engageable with cooperating teeth 25 on the gear 14, so that when the sleeve is slidably shifted to bring the teeth 24 into engagement with the teeth 25, the main shaft 20 is locked to the power shaft 11 for direct drive. The drive shaft 6, extending to the axle 3, is coupled directly to the rear end of the main shaft 20 of the special transmission, so that direct drive is thus carried to the axle 3. The drive shaft 8 for the axle 4 is coupled to a third or auxiliary shaft, seen at 30 in Figure 2, within the housing 12. This shaft 30 carries a gear 32 which is rotatably supported on the shaft 30 and constantly meshes with the large gear 22 on the main shaft 20. The gear 32 is of the same size as the gear 22, and thus travels at the same speed as the latter; but since both said gears are normally free on their respective shafts no power is transmitted by them to the drive shaft 8 and the axle 4, except under special conditions.

When the clutch sleeve 23 is shifted to disengage its teeth 24 from the clutch teeth 25 of the gear 14, it may be moved in the opposite direction to engage its internal or spline teeth 26 with clutch teeth 27 carried by the gear 21. This provides the high-speed or "over-drive" gear ratio for which the power is transmitted from the gear 14 to gear 15 on the side shaft 16, and from gear 17 on said shaft to the gear 21 which is now locked to the main shaft 20 by means of clutch teeth 26 and 27. With this arrangement the gears 22 and 32 are still freely rotatable on the shafts which support them and take no part in the transmission of power. The power is transmitted to the shaft 20 at a speed somewhat greater than that of the power shaft 11, and from the shaft 20 it is carried by drive shaft 6 to the axle 3; but the axle 4 and its drive shaft 8 are not connected for transmission of power from the shaft 11.

A third adjustment of the auxiliary transmission consists in leaving the clutch sleeve 23 at its intermediate position, as shown in Figure 4, so that its clutch teeth are disengaged both from the teeth 25 of gear 14 and from the teeth 27 of gear 21. A second clutch sleeve 33, also splined to the main shaft 20, is formed with internal teeth 34 which engage clutch teeth 35 on the hub of the gear 22 when the sleeve is shifted forwardly from its position illustrated in Figure 4. This couples the gear 22 positively to the main shaft 20 so that power delivered through gear 14 to the gear 15 on the shaft 16 is transmitted by the gear 18 on said shaft to the gear 22, and thence to the main shaft 20 and to the axle drive shaft 6 for the axle 3. The shaft 30 is also provided with a slidable clutch sleeve 36 which is normally disconnected from the gear 32, but which is engageable with clutch teeth 37 on the hub of said gear. The clutch sleeve 33 is actuated by means of a shifter fork 38, and an additional shifter fork 39 may be made rigid with the fork 38 to operate simultaneously therewith for shifting the clutch 36 into engagement with the gear 32 and to couple the latter operatively with the shaft 30. Thus, in the low-speed or "under-drive" arrangement of the transmission the shafts 20 and 30 are geared together for simultaneous operation at equal speeds by means of gears 22 and 32, and the drive shafts 6 and 8, and their respective axles 3 and 4, are likewise coupled for simultaneous operation.

A separate shifter 40 is provided for the clutch member 23, but since the clutch 23 must remain in its neutral position (as seen in Figure 4) whenever the clutches 33 and 36 are shifted to operative position, it becomes feasible and preferable to operate all these clutches by means of a single control lever, which may be designed for actuating the two shifter rods 38ᵃ and 40ᵃ selectively, as for example, with the familiar H-slot arrangement commonly employed in automobile gear shifts.

As shown in Figure 5 this includes a single control lever 50 actuating a rock shaft 51 which carries lugs 52 and 53 for engaging in notches 54 and 55 respectively of the shifter rods which are coupled to the rods 38ᵃ and 40ᵃ. The lugs 52 and 53 are so spaced on the shaft 51 that only one of them can engage its cooperating notch at one time. But the shaft 51 and its control handle 50 are shiftable bodily in the direction of the shaft axis and under control of the H-slot in the segment 56 in which the lever 50 swings, so that with the shaft and lever at one position the lug 52 is operative for shifting the rod 38ᵃ, and with the lever and shaft moved over to the other position the lug 53 becomes operative for shifting the rod 40ᵃ.

Such a single control member makes it impossible for the driver to set up any gear connection or arrangement other than those for which the special transmission is intended. Thus I am able to insure that the power at the higher ratios, represented by the over-drive and direct-drive arrangements in the special transmission, can be transmitted to only one of the dual axles, thus avoiding internal strains and gear fight, with the danger of breakage, as already explained. And by the simple expedient of adding the auxiliary shaft 30 to the special transmission, and providing it with a loose gear 32 and clutch means 36 connected to work simultaneously with the clutch 33 and alternatively with the clutch 23, I am also able to provide that whenever the lower speed ratios, represented by the under-drive of the special transmission, are employed, the power will be transmitted simultaneously to both of the dual axles, and driving strains will accordingly be divided between them. While there is shown and described herein certain specific structure embodying the invention, it will be manifest to those skilled in the art that various modifications and rearrangements of the parts may be made without departing from the spirit and scope of the invention, and that the same is not limited to the particular form herein shown and described, except in so far as indicated by the appended claims.

I claim as my invention:

1. In a motor vehicle having dual driving axles with independent drive shafts therefor, a special transmission assembly including a power delivery shaft, a main shaft and a side shaft, the main shaft being connected directly to one of said axle drive shafts, gears on the power shaft, the main shaft and side shaft providing an over-drive train and an under-drive train, means in said assembly for selectively connecting said power delivery shaft to only one of said axle drive shafts for operation of the latter through the over-drive train or to both of said axle drive shafts for revolution of both simultaneously at the same speed through the under-drive train, and means positively preventing the driving of both said dual axles through the over-drive train.

2. In a motor vehicle having dual driving axles with independent drive shafts therefor, a special transmission assembly including a power delivery shaft, a main shaft and a side shaft, the main shaft being connected directly to one of said axle drive shafts, gears on the power shaft, the main shaft and side shaft providing an over-drive train and an under-drive train, means in said assembly for selectively connecting said power delivery shaft to only one of said axle drive shafts for operation of the latter through the over-drive train or to both of said axle drive shafts for revolution of both simultaneously at the same speed through the under-drive train, and means positively preventing the driving of both said dual axles through the over-drive train, together with means positively preventing the driving of only one of said axle drive shafts through the under-drive train.

3. In a motor vehicle having dual driving axles with independent drive shafts therefor, a special transmission assembly including a power delivery shaft, a main shaft, a side shaft and an auxiliary shaft, the main shaft being connected directly to one of said axle drive shafts and the auxiliary shaft being connected directly to the other axle drive shaft, gears on the main shaft and side shaft providing an over-drive train and an under-drive train, said under-drive train including a gear normally loose on the main shaft with clutch means by which said gear is connected to said main shaft only in providing the under-drive, the sole drive connection from the main shaft to the auxiliary shaft including said loose gear by which both axle drive shafts are connected to the power shaft only for the under-drive.

4. In a motor vehicle having dual driving axles with independent drive shafts therefor, a special transmission assembly including a power delivery shaft, a main shaft and a side shaft, the main shaft being connected directly to one of said axle drive shafts, gears on the power shaft, main shaft and side shaft providing an over-drive train and an under-drive train, said under-drive train including a gear normally loose on the main shaft with clutch means by which said gear is connected to said main shaft only in providing the under-drive, together with an auxiliary shaft and a drive connection thereto from the side shaft including gearing proportioned to drive said auxiliary shaft at the same speed as that at which the main shaft is operated by the under-drive, said auxiliary shaft being connected directly to the other axle drive shaft, and clutch means to disengage the auxiliary shaft from its drive connection with the side shaft, with means for shifting said clutch simultaneously with the clutch for said loose gear of the under-drive train.

5. In a motor vehicle having dual driving axles with independent drive shafts therefor, a special transmission assembly including a power delivery shaft, a main shaft and a side shaft, the main shaft being connected directly to one of said axle drive shafts, a disengageable high speed drive connection between the power delivery shaft and said main shaft, and a low speed train including gears on the side shaft and a gear normally loose on the main shaft with clutch means for connecting said gear to said shaft at will, together with an auxiliary shaft connected directly to the other axle drive shaft, and a gear on said auxiliary shaft meshed with the loose gear of the low speed train whereby both axles are driven when the low speed is operative but only one axle can be driven through the high speed drive connection.

6. In the combination defined in claim 5, said side shaft being constantly driven from the power delivery shaft and said loose gear being constantly in mesh with its driver on the side shaft and with the gear on the auxiliary shaft, and clutch means operable to disengage said last-mentioned gear from the auxiliary shaft whenever the low speed gear runs loose on the main shaft.

7. In a motor vehicle having dual driving axles with independent drive shafts therefor, a special transmission assembly including a power delivery shaft, a main shaft and a side shaft, the main shaft being connected directly to one of said axle drive shafts, a disengageable high speed drive connection between the power delivery shaft and said main shaft and a low speed train including gears connecting the power shaft to the main shaft through the side shaft, one of said gears being normally loose on its shaft with clutch means for connecting said gear to its shaft at will, together with an auxiliary shaft connected directly to the other axle drive shaft and a gear on said auxiliary shaft meshing with one of said gears of the low speed train whereby both axles are driven when the low speed is operative.

8. In the combination defined in claim 7, said gear on the auxiliary shaft being constantly meshed with its driver in the low speed train, and clutch means operable to disengage the auxiliary shaft from the gear thereon whenever the normally loose gear of said train is disconnected from its shaft.

9. In a motor vehicle having dual driving axles with independent drive shafts therefor, a special transmission assembly including a power delivery shaft, a main shaft and a side shaft, the main shaft being connected directly to one of said axle drive shafts, a disengageable direct drive connection between the power delivery shaft and said main shaft, and a low speed train including gears connecting the power shaft to the main shaft through the side shaft, one of said gears being normally loose on its shaft with clutch means for connecting said gear to its shaft at will, together with an auxiliary shaft connected directly to the other axle drive shaft and a gear on said auxiliary shaft meshing with one of said gears of the low speed train whereby both axles are driven when the low speed is operative but only one axle can be driven through the direct drive connection.

10. In a motor vehicle having dual driving axles with independent drive shafts therefor, a special transmission assembly including a power delivery shaft, a main shaft and a side shaft, the main shaft being connected directly to one of said axle drive shafts, a high speed drive connection between the power delivery shaft and said main shaft, and a low speed train including gears on the side shaft and main shaft, clutch means connecting said power delivery shaft to only one of said axle drive shafts for operation through the high speed connection, and separate clutch means operable only when the first mentioned clutch means is disengaged and serving to connect said power delivery shaft to both axle drive shafts for revolution of both simultaneously through the low speed train, together with a single control member by which the first mentioned clutch means and the said separate clutch means are operable selectively.

11. In a motor vehicle having dual driving axles with independent drive shafts therefor, a special transmission assembly including a power delivery shaft, a main shaft and a side shaft, the main shaft being connected directly to one of said axle drive shafts, a high speed drive connection between the power delivery shaft and said main shaft, and a low speed train including gears on the side shaft and main shaft, means in said assembly selectively connecting said power delivery shaft to only one of said axle drive shafts for operation of the latter through the high speed connection or to both of said axle drive shafts for revolution of both simultaneously at the same speed through the low speed train, and means positively preventing the driving of both of said dual axles through the high speed connection.

12. In a motor vehicle having dual driving axles with independent drive shafts therefor, a special transmission assembly including a power delivery shaft, a main shaft and a side shaft, the main shaft being connected directly to one of said axle drive shafts, gearing connecting said main shaft with the other axle drive shaft, a high speed drive connection between the power delivery shaft and said main shaft, and a low speed train including gears on the side shaft and main shaft, means in said assembly selectively connecting said power delivery shaft to only one of said axle drive shafts for operation of the latter through the high speed connection or to both of said axle drive shafts for revolution of both simultaneously at the same speed through the low speed train, and means automatically disconnecting the gearing between the main shaft and said other axle drive shaft when the high speed connection is operative whereby the driving of both of said dual axles through the high speed connection is positively prevented.

EUGENE J. DONDLINGER.